US010838413B2

(12) United States Patent
Schleiss et al.

(10) Patent No.: US 10,838,413 B2
(45) Date of Patent: Nov. 17, 2020

(54) SYSTEMS AND METHODS FOR MULTI-SITE PERFORMANCE MONITORING OF PROCESS CONTROL SYSTEMS

(71) Applicant: FISHER-ROSEMOUNT SYSTEMS, INC., Round Rock, TX (US)

(72) Inventors: Trevor Duncan Schleiss, Austin, TX (US); David R. Denison, Austin, TX (US); Manikandan Janardhanan, Cedar Park, TX (US); Shaobo Qiu, Austin, TX (US); William L. Sells, Georgetown, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 418 days.

(21) Appl. No.: 15/928,608

(22) Filed: Mar. 22, 2018

(65) Prior Publication Data
US 2019/0101910 A1 Apr. 4, 2019

Related U.S. Application Data

(60) Provisional application No. 62/567,009, filed on Oct. 2, 2017.

(51) Int. Cl.
*G05B 23/02* (2006.01)
(52) U.S. Cl.
CPC ..... *G05B 23/0216* (2013.01); *G05B 23/0272* (2013.01)

(58) Field of Classification Search
CPC .............. G05B 23/0216; G05B 23/0272
See application file for complete search history.

(56) References Cited

U.S. PATENT DOCUMENTS

| 5,960,214 | A  | * | 9/1999  | Sharpe, Jr. ......... | G05B 19/0423 |
|           |    |   |         |                      | 700/9        |
| 6,604,023 | B1 | * | 8/2003  | Brown .................. | G05B 15/02   |
|           |    |   |         |                      | 700/276      |
| 10,372,096 | B2 | * | 8/2019 | Ottosson ............... | H04N 5/225  |
| 2002/0077711 | A1 | * | 6/2002 | Nixon ................ | G05B 23/0272 |
|           |    |   |         |                      | 700/51       |
| 2004/0030429 | A1 | * | 2/2004 | Baba ................. | G05B 23/0272 |
|           |    |   |         |                      | 700/108      |
| 2012/0296448 | A1 |   | 11/2012 | Balentine et al.    |              |
| 2017/0102695 | A1 |   | 4/2017  | Hilemon et al.      |              |
| 2017/0102961 | A1 |   | 4/2017  | Hilemon et al.      |              |

(Continued)

*Primary Examiner* — Mohamed A. Wasel
(74) *Attorney, Agent, or Firm* — Marshall, Gerstein & Borun LLP

(57) ABSTRACT

A performance monitoring system enables users of computing devices to easily view performance indicators for any of a number of different process control sites. A computing device displays a graphical user interface (GUI) that enables a user to identity one or more process control sites he or she is interested in monitoring. The computing device communicates with one or more servers associated with the process control site(s) to receive and display a set of performance indicators tailored to the selected process control sites and to the user's interests. In some instances, the user selects multiple sites and the system acts as an aggregator that selects, prioritizes, and/or categorizes (based on any of a number of different factors) performance indicators to be provided to the user for the multiple sites.

25 Claims, 8 Drawing Sheets

(56) References Cited

U.S. PATENT DOCUMENTS

| | | |
|---|---|---|
| 2017/0104706 A1 | 4/2017 | Hilemon et al. |
| 2017/0104760 A1 | 4/2017 | Hilemon et al. |
| 2017/0104825 A1 | 4/2017 | Hilemon et al. |
| 2017/0160715 A1* | 6/2017 | De Boer ............ G05B 23/0267 |
| 2018/0017959 A1* | 1/2018 | Pandian ............ G05B 23/0216 |
| 2018/0039261 A1* | 2/2018 | Haller ................ G05B 23/0221 |

* cited by examiner

| Menu — 302 | 364 → Watchlist | | 363 |

306A → Springfield Oil    365A

| 368A | 370A | 372A | 374A |
| --- | --- | --- | --- |
| Tag | Type | Value | Flag? |
| FT-1254 | Meas | 24 gpm | No |
| LV-1923 | Meas | 40% | No |
| PU-2384 | Status | Off | Yes |
| TC-5398 | Health Index | 95% | No |
| PT-8324 | Perf Index | 80% | No |

306B → South Park Power Plant    365B

| 368B | 370B | 372B | 374B |
| --- | --- | --- | --- |
| Tag | Type | Value | Flag? |
| LT-8892 | Meas | 24 gpm | No |
| MTR-34 | Status | On | Yes |
| CTRL-534 | Status | On | Yes |
| CV-2347 | Meas | 50% | No |
| TT-8324 | Util Index | 23% | No |

SYSTEMS AND METHODS FOR MULTI-SITE PERFORMANCE MONITORING OF PROCESS CONTROL SYSTEMS

CROSS-REFERENCE TO RELATED APPLICATION

This application claims priority to and benefit of U.S. Provisional Application Ser. No. 62/567,009, which was filed on Oct. 2, 2017 and is titled "Systems and Methods for Multi-Site Performance Monitoring of Process Control Systems," the entire disclosure of which is expressly incorporated herein by reference.

TECHNICAL FIELD

The present disclosure generally relates to performance for process control plants and, in particular, a system for providing user-specific and site-specific monitoring of multiple process control sites.

BACKGROUND

Process control systems, such as distributed or scalable control systems like those used in power generation, chemical, petroleum, or other processes, typically include one or more process controllers communicatively coupled (directly or indirectly) to each other, to at least one host or workstation via a process control network, and to one or more field devices via analog, digital, or combined analog/digital buses. Generally speaking, the communication links between these units may be wired or wireless in nature.

The field devices, which may be, for example, valves, valve positioners, switches, and transmitters (e.g., temperature, pressure, level and flow rate sensors), are located within the process environment and generally perform physical or process control functions, such as opening or closing valves, or measuring process parameters to control one or more processes executing within the process plant or system. One or more of the field devices may be communicatively coupled to an Input/Output ("I/O") card, which in turn is communicatively coupled to one of the process controllers (e.g., via a backplane).

The process controllers, which are typically located within the process plant environment, receive signals indicative of process measurements or process variables made by or associated with the field devices and/or other information pertaining to the field devices, and execute controller applications or routines. Each controller uses the received information to implement a control routine and generate control signals that are sent over the buses to the field devices to control the operation of the process or plant. The controller routine or routines implement control modules that make process control decisions, generate control signals based on the received information, and coordinate with the control modules or blocks in the field devices (e.g., HART®, Wireless HART®, or FOUNDATION® Fieldbus field devices). The control modules in the process controllers send the control signals over the communication lines or signal paths to the field devices, to thereby control the operation of the process.

The field devices may be either single-variable devices or multi-variable devices (e.g., sometimes called smart field devices). Single-variable devices generate one output variable value, while multi-variable devices generate a plurality of values corresponding to a plurality of output variables. Multi-variable devices include field devices measuring a plurality of process variables associated with conditions within a process plant, as well as field devices generating process variables not representing a directly measured process output (e.g., a score or an index that is calculated rather than directly measured via a sensor). Multi-variable devices, such as field devices conforming to the well-known Fieldbus protocol, may perform control calculations, alarming functions, and other control functions commonly implemented within a controller.

Information from the field devices and the process controllers is typically made available via a plant network to one or more other hardware devices, such as operator workstations, maintenance workstations, personal computers, handheld devices, data historians, report generators, and centralized databases. The information communicated over the network enables the hardware devices to perform desired functions with respect to the process. Each of these hardware devices typically is centralized across the process plant or across a portion of the process plant. For example, the workstations may run applications that, for example, enable an operator to perform functions with respect to controlling a process or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The plant network utilized by the hardware devices, controllers, and field devices may include a wired communication path, a wireless communication path, or a combination of wired and wireless communication paths.

Aside from the devices described above, a typical process plant has many other supporting devices that are also necessary for or related to process operation. These additional devices include, for example, power supply equipment, power generation and distribution equipment, rotating equipment such as turbines, motors, etc., which are located at numerous places in a typical plant. While this additional equipment does not necessarily create or use process variables and, in many instances, is not controlled or even coupled to a process controller for the purpose of affecting the process operation, this equipment is nevertheless important to, and ultimately necessary for proper operation of the process.

As is known, problems frequently arise within a process plant environment, especially within a process plant having a large number of field devices and supporting equipment. These problems may be broken or malfunctioning devices, logic elements, such as software routines, residing in improper modes, process control loops being improperly tuned, one or more failures in communications between devices within the process plant, etc. These and other problems, while numerous in nature, generally result in the process operating in an abnormal state (i.e., the process plant being in an abnormal situation) which is usually associated with suboptimal performance of the process plant.

Additionally, many field devices, and especially smart field devices, include diagnostic data of interest to operators and maintenance personnel. Some such diagnostic data may include whether the device is in service (i.e., device state information), a calibration due date, various device alarms and alerts etc. Other such data includes information specific to the device, the device type, the manufacturer, or the process control system in which the device is operating. Still other diagnostic data includes processed statistical data originating within the field device. For example, the field device may be equipped or programmed with one or more statistical processing modules (SPMs) that collect and process data from one or more sensors within the field device.

The workstations in the plant typically include (i) one or more operator applications designed to provide an operator a user interface for controlling the operation, and (ii) one or more maintenance and/or diagnostic applications designed to provide an interface that allows an operator to view maintenance alarms and alerts generated by field devices within the process plant, to test devices within the process plant, and to perform maintenance activities on the field devices and other devices within the process plant. Diagnostic applications have also been developed to diagnose problems within the supporting equipment within the process plant.

Commercial software such as the AMS™ Suite from Emerson Process Management enables communication with and stores data pertaining to field devices to ascertain and track the operating state of the field devices. See also U.S. Pat. No. 5,960,214, entitled "Integrated Communication Network for use in a Field Device Management System." In some instances, the AMS™ software may be used to communicate with a field device to change parameters within the field device, to cause the field device to run applications on itself such as, for example, self-calibration routines or self-diagnostic routines, to obtain information about the status or health of the field device, etc. This information may include, for example, status information (e.g., whether an alarm or other similar event has occurred), device configuration information (e.g., the manner in which the field device is currently or may be configured and the type of measuring units used by the field device), device parameters (e.g., the field device range values and other parameters), etc. Of course, a maintenance technician may use this information to monitor, maintain, and/or diagnose problems with field devices.

The AMS suite and other diagnostic and optimization applications are typically implemented on a system-wide basis in one or more of the operator or maintenance workstations located within the process plant (e.g., in a control room), and may provide preconfigured displays to the operator or maintenance personnel regarding the operating state of the process plant, or the devices and equipment within the process plant. Typical displays include alarming displays that receive alarms generated by the process controllers or other devices within the process plant, control displays indicating the operating state of the process controllers and other devices within the process plant, maintenance displays indicating the operating state of the devices within the process plant, etc. Likewise, these and other diagnostic applications may enable an operator or a maintenance person to retune a control loop or to reset other control parameters, to run a test on one or more field devices to determine the current status of those field devices, or to calibrate field devices or other equipment.

SUMMARY

The described systems and techniques enable users of end user computing devices ("computing devices") to easily monitor the performance of process control systems at any of a number of different process control sites. A computing device displays a graphical user interface (GUI) that allows a user to identity one or more process control sites he or she is interested in monitoring. The computing device communicates with one or more servers associated with the process control site(s) to receive and display a set of performance indicators tailored to the selected process control sites and to the user's interests. In some instances, the user selects multiple sites and the system acts as an aggregator that selects, prioritizes, and/or categorizes (based on any of a number of different factors) performance indicators to be provided to the user for the multiple sites.

Note, this summary has been provided to introduce a selection of concepts further described below in the detailed description. As explained in the detailed description, certain embodiments may include features and advantages not described in this summary, and certain embodiment may omit one or more features and/or advantages described in this summary.

BRIEF DESCRIPTION OF THE DRAWINGS

Each of the figures described below depicts one or more aspects of the disclosed system(s) and/or method(s), according to an embodiment. The detailed description refers to reference numerals included in the following figures.

FIG. 3C depicts an example display including a watchlist that may be provided by a computing device when implementing a performance monitoring client.

DETAILED DESCRIPTION

As noted in the Summary, the present disclosure describes a performance monitoring system that enable users of computing devices to easily monitor the performance of process control systems at any of a number of different process control sites. Advantageously, the performance monitoring system can easily be scaled for use by hundreds or even thousands of computing devices and users. Any number of computing devices may download and utilize a client performance monitoring application that seamlessly communicates with backend systems and services to provide user-specific and/or site-specific performance indicators (sometimes called "key performance indicators" or KPIs).

Process control sites may vary in the quantity and type of performance indicators that provide useful information regarding the health or status of a site. Further, users may have varying roles and interests with respect to a given site, and consequently may vary with respect to their interests in viewing different types and quantities of performance indicators (even with respect to the same site). Because the performance monitoring system may store performance indicator preferences regarding specific users and specific sites at the backend, the computing devices (and software running thereon) requires very little customization or reconfiguration to enable performance monitoring of different sites. Each instance of the performance monitoring application running on the computing devices operates in a similar fashion, enabling the backend systems to handle much of the logic driving the tailoring of the performance indicators to be displayed to a specific user for a selected one or more sites.

Below, the following is described: (I) an example performance monitoring system 101, shown in FIGS. 1 and 2, that enables users of computing devices 14 to easily view performance indicators for any of a number of different process control sites; (II) various displays, shown in FIGS. 3A-3C, that may be displayed via a GUI provided by one of the computing devices 14 to enable site selection and performance monitoring; (III) block diagrams, shown in FIG. 4, of an example computing device 14 and an example host device 103; and (IV) flowcharts, shown in FIGS. 5 and 6, of example methods to facilitate performance monitoring that may be implemented by the system 101.

I. Example Performance Monitoring System

Figure 1:
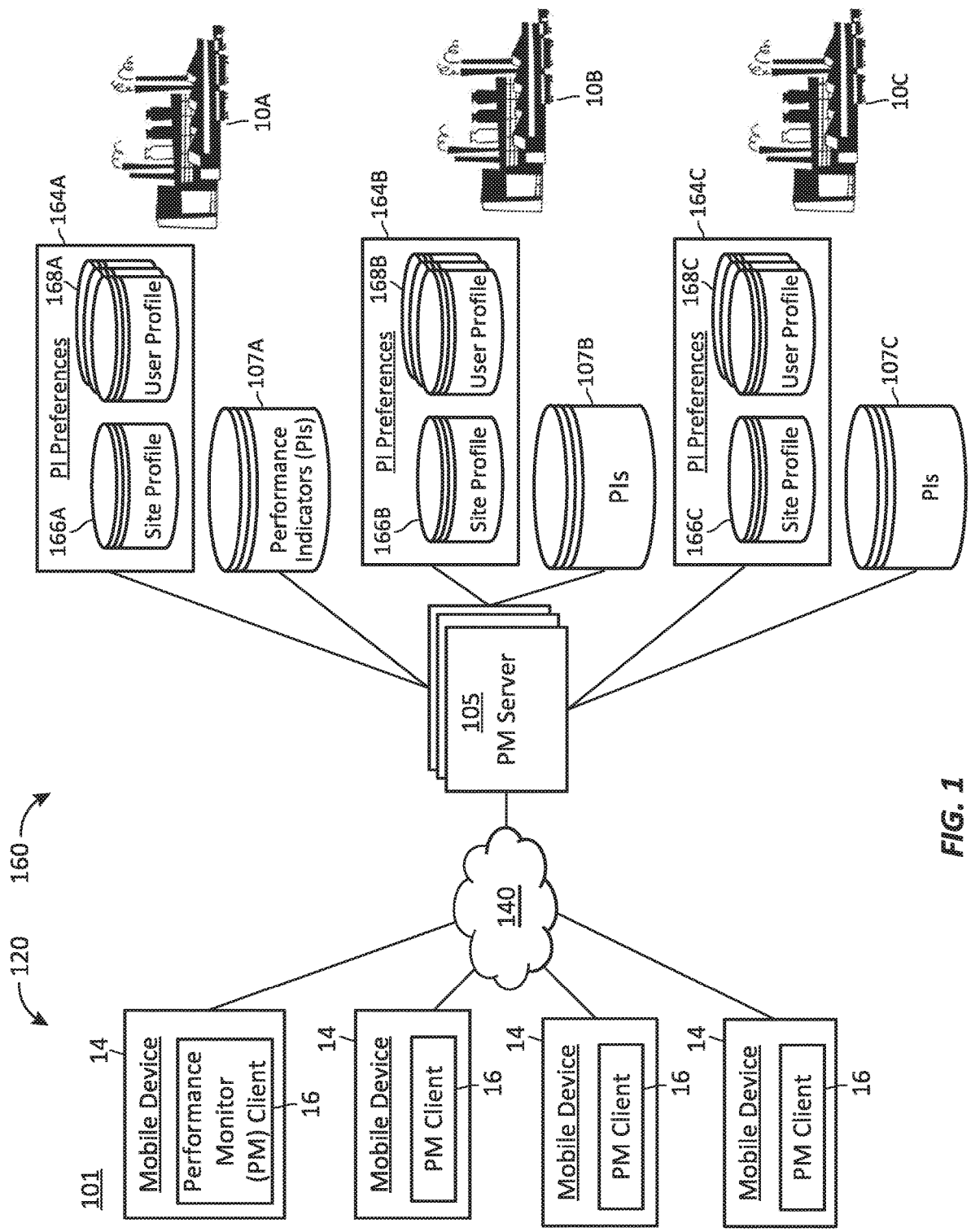
FIG. 1 is a block diagram of a system that enables users of computing devices to easily view user-specific and site-specific performance indicators for any of a number of different process control sites.

Referencing FIG. 1, the system 101 enables users of the computing devices 14 to easily view user-specific and site-specific performance indicators for any of a number of different process control sites 10A-C. The system 101 includes a frontend 120 (which includes the computing devices 14 each running an instance of a performance monitoring (PM) client 16) communicatively connected via a network 140 to a backend 160 configured to provide performance indicators for monitoring each of a plurality of sites 10A-10C.

The performance indicators are variables conveying information relevant to operation of a process control plant, and may include process level data (e.g., flow rates, measured temperatures, alarms, etc.) and/or diagnostic data from an asset management system (AMS). Example AMS data includes a health index, a performance index, a utility index, and a variability index.

Each computing device 14 may be any suitable electronic computing device. As shown in FIG. 1, any one of the computing devices 14 may be a mobile device (e.g., a mobile phone, a tablet, or a personal digital assistant (PDA)) that is, for example, battery powered (e.g., via a lithium ion battery) and/or configured for wireless communication. Advantageously, mobile computing devices 14 enable a user (e.g., an operator or engineer) to monitor relevant plant information when the user is not at a stationary workstation. For example, the user may monitor information when he or she walks around a plant, or when he or she is off-site. Further, it will be appreciated that, in some implementations, one or more computing devices 14 may be stationary. If desired, one or more computing devices 14 may be any suitable general purpose computing device (e.g., any computing system with a general purpose processor, such as a laptop, desktop, etc.), special purpose computing device (e.g., an ASIC, a specially configured process control workstation, etc.), or some combination thereof.

The backend 160 includes performance indicators (PIs) and PI preferences for each site 10A-10C. In particular, the backend 160 includes (i) PIs 107A and PI preferences 164A for site 10A, (ii) PIs 107B and 164B for site 10B, and (iii) PIs 107c and PI preferences 164C for site 10C.

Further, the backend 160 includes one or more PM servers 105 bridging the gap between the computing devices 14 and the various components of the backend 160, making available to the computing devices 14 data stored at the backend 160 such as the PIs 107A-C. Host devices implementing the PM servers 105 are sometimes referred to as "PM servers" or "servers." The PM servers 105 also implement the logic for selecting, categorizing, prioritizing, and/or aggregating the PIs 107A-C to be provided to any one of the computing devices 14 at any given time. Examples of the mobiles devices 14, the PM clients 16, and the PM servers 105 are described in more detail with reference to FIG. 4. The one or more PM servers 105 may include a web server, an application server, a mobile application server, or some combination thereof.

The network 140 may be any suitable telecommunications network or combination of networks (e.g., including wide-area networks (WANs), local area networks (LANs), and/or personal area networks (PANs)), including any suitable combination of links (which may be wireless or wired in nature) and nodes (e.g., including end-nodes and intermediary nodes, such as routers and switches).

In operation, a computing device 14 displays a number of options giving a user the ability to select one of the sites 10A-10C. For example, a user may select the site 10A, causing the computing device 14 to transmit via the network 140 a message including: (i) a request for PIs; (ii) a site ID for the site 10A; and (iii) a user ID for a user of the computing device 14. The message may be any suitable data encapsulation unit, such as a packet, datagram, or frame. The PM server(s) 105 receives the request and selects a set of PIs from the PIs 107A based on an analysis of the site profile 166A and a user profile 168A corresponding to the received user ID. The PM server(s) 105 then transmit the selected set of PIs to the computing device 14 for display.

Any given computing device 14 can be utilized to monitor any one or more of the process control sites 10A-C. While FIG. 1 depicts three process control sites, the system 101 can be used to monitor any number of process control sites.

II. Overview of an Example Process Control Site

Figure 2:
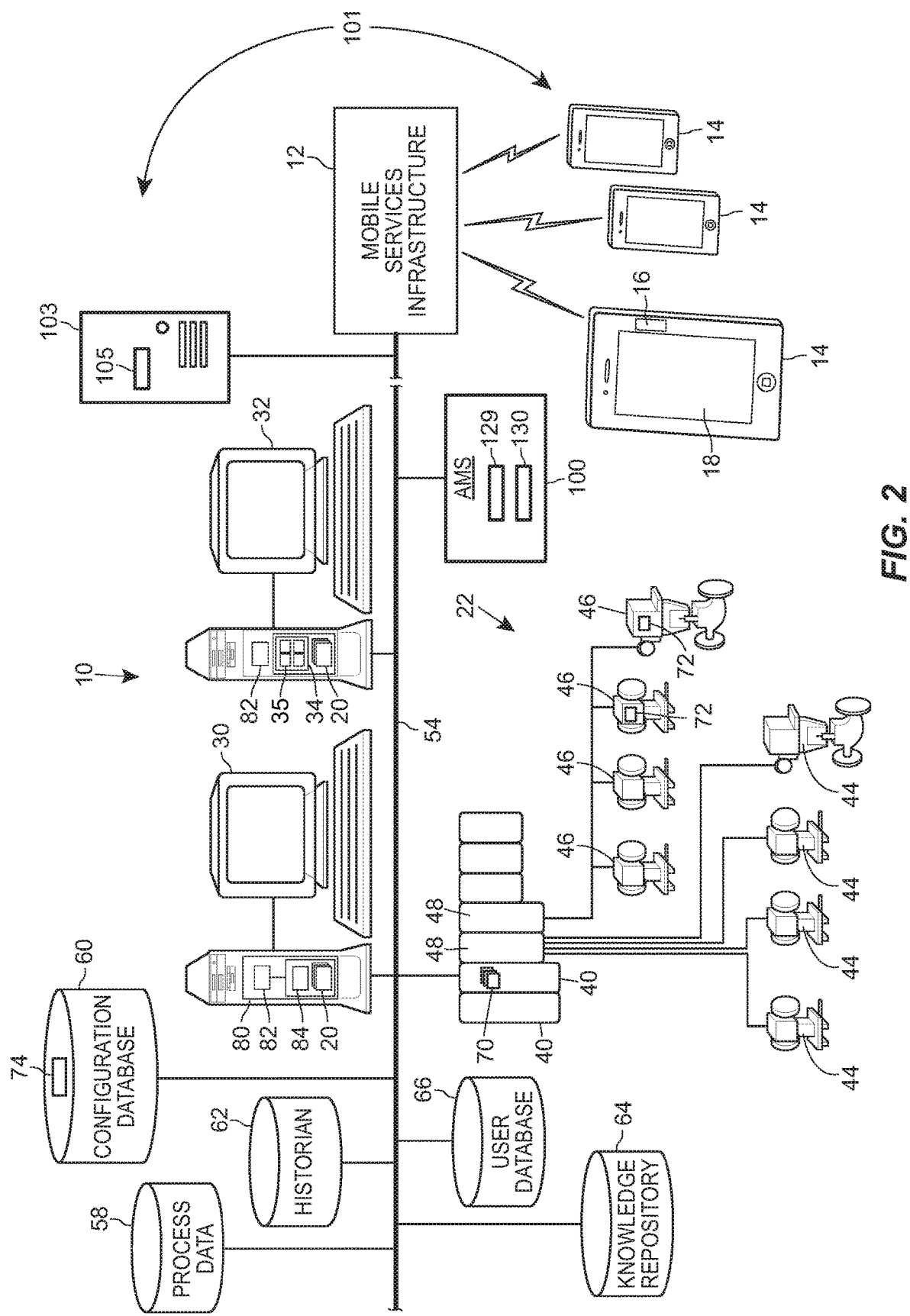
FIG. 2 is a schematic of an example process control site.

FIG. 2 is a schematic of a process control site 10, representing an example of any one of the process control sites 10A-C shown in FIG. 1. The system 101 includes a host device 103 implementing a server application 105 and one or more computing devices 14 (which are not necessarily located on the premises of the site 10A). The host 103 is sometimes referred to as the "server 103." As will be described in detail, the host 103 selects and provides to any of the computing devices 14 a set of performance indicators that has been tailored to a user of the computing device 14 and sites of interested selected by the user.

As shown in FIG. 2, the site 10 may include a mobile services infrastructure 12 that facilitates real-time communication to the computing devices 14 of any of the process plant data (including PIs) available within the process control plant at the site 10, while maintaining the security of the process plant network. Each of the computing devices 14 includes, among other elements, a client application 16 executable by the computing device 14 to allow a user to select a site (such as the site 10A) and to view, via a GUI 18, a tailored set of PIs for the site 10A.

The process plant environment of FIG. 2 includes a data highway 54 (which may be, for example, an Ethernet link) to which the host 103 and computing devices 14 may be communicatively connected, directly or indirectly. Further, any one or more of the following may be communicatively coupled to the data highway 54: (A) a set of workstations 30 and 32; (B) a distributed control system (DCS) or network 22 including controllers 40, input/output (I/O) devices 48, and field devices 44 and 46; and (C) a plurality of databases 58-66. While the controllers 40, I/O cards 48 and field devices 44, 46 are typically located down within and distributed throughout the sometimes harsh plant environment, the operator workstations 30 and 32 and the databases 58-66 are usually located in control rooms or other less harsh environments easily assessable by controller, maintenance, and various other plant personnel. However, in some cases, handheld devices (not shown) coupled to the data highway 54 may be used to implement these functions, and these handheld devices are typically carried to various places in the plant. Such handheld devices, and in some cases, operator workstations and other display devices may be connected to the DCS 22 via wireless communication connections. The handheld devices are distinguished from the computing devices 14 in that the computing devices are not necessarily present on the process plant premises and need not be coupled directly (via wired or wireless means) to the data highway 54. Below, the set of workstations 30 and 32, the DCS 22, and the plurality of databases 58-66 are described in more detail before turning to the AMS system 100.

Regarding the workstations 30 and 32, each may include various applications used for various different functions performed by personnel at the site 10. Each of the workstations 30 and 32 includes a memory 80 that stores various applications, programs, data structures, etc., and a processor 82 which may be used to execute any of the applications stored in the memory 80. Each memory 80 of the workstations 30 and 32 may include one or more applications 20 utilized by plant personnel to supervise or control operation of the process plant and of the DCS 22.

Broadly speaking, the viewing or monitoring applications 20 include a user interface application that uses various different displays to graphically depict process graphics to each of the operator and the maintenance technician and/or other users. The viewing applications 20 may allow operators to view display modules configured to provide specific information about the operation of specific areas of the process plant at the site 10, and to control the operation of the process plant according to the information on the display modules. The display modules may be rendered on the workstations 30, 32, and may incorporate real-time process data received from the controllers 40 and the field devices 44, 46. As used herein, "real-time" communication of data refers to electronic communication of data through electronic communication networks with ordinary delays for processing, routing, and transmission, without the intentional introduction of additional non-trivial delays. In some embodiments, trivial delays of less than five seconds (and preferably less than two seconds) may be introduced to reduce network congestion when communicating data in real-time. The display modules may be any type of interface that, for example, enables an operator or other use to manipulate data values (e.g., perform reads or writes) to monitor or alter operation of: (i) the field devices 44, 46, (ii) control modules 70 and/or function blocks 72 of the controllers 40 and field devices 44 and 46, and (iii) the DCS 22 and process plant as a whole. The display modules may be stored in the memory 80 of the workstations 30, 32, and may also be stored in the configuration database 60.

Further, the workstation 32 includes a graphical configuration system 34, which generally facilitates the creation of control and monitoring schemes, including graphical displays, for control of the process plant. The graphical configuration system 34 may include, for example, a configuration editor 35 that can be used to control modules and control module templates, graphical displays and templates, and other aspects of the control system, that are stored in a library, and that can be subsequently used create instances or usages that are actually executed in the control of the process plant by downloading instances of the control modules to a controller, or by executing instances of the graphical displays in user displays presented to, for example, the operator and maintenance person, during operation of the plant at the site 10. Of course, each of the graphics configuration system 34, the configuration editor 35, and the various control modules, templates, and graphical displays may be stored in a tangible computer readable memory or medium and execute on one or more processors to perform the functions described herein.

Further still, the workstation 30 also includes, in addition to the display and viewing application 20, one or more process controller configuration applications 84 which may include, for example, control module creation applications, operator interface applications and other data structures which can be accessed by any authorized configuration engineer to create and download control routines or modules, such as the control modules 70 and 72, to the various controllers 40 and devices 46 of the plant at the site 10. The configuration applications 84 also include the display or graphical configuration system 34 having the configuration editor 35, which may be used to create the control modules 70.

Regarding the DCS 22, the one or more controllers 40 may be connected to the one or more field devices 44 and 46 (which may be smart devices) via the I/O devices or cards 48 which may be, for example, Fieldbus interfaces, Profibus interfaces, HART interfaces, standard 4-20 ma interfaces, etc. The I/O devices 48 and controllers 40 may be coupled via a backplane, and the I/O devices 48 may act as a translator between the controllers 40 and the field devices 44 and 46 (e.g., translating a 4-20 mA signal from the field devices 44 and 46 to a digital signal for which the controllers 40 are configured). The controllers 40 are also coupled to the one or more host or operator workstations 30-32 via the data highway 54.

As is known, each of the controllers 40, which may be, by way of example, the DeltaVTM controller sold by Emerson Process Management, stores and executes a controller application that implements a control strategy using any number of different, independently executed, control modules or blocks 70. Each of the control modules 70 can be made up of what are commonly referred to as function blocks wherein each function block is a part or a subroutine of an overall control routine and operates in conjunction with other function blocks (via communications called links) to implement process control loops within the process plant at the site 10. As is well known, function blocks, which may be objects in an object oriented programming protocol, typically perform one of an input function, such as that associated with a transmitter, a sensor or other process parameter measurement device, a control function, such as that associated with a control routine that performs PID, fuzzy logic, etc., control, or an output function that controls the operation of some device, such as a valve, to perform some physical function within the process plant. Of course hybrid and other types of complex function blocks exist, such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function block, ladder logic, etc., and are not limited to being designed and implemented using the function block or any other particular programming technique. Each of the controllers 40 may also support the AMS® suite of applications sold by Emerson Process Management and may use predictive intelligence to improve availability and performance of production assets including mechanical equipment, electrical systems, process equipment, instruments, non-smart and smart field devices 44, 46, etc.

As described, the DCS 22 includes one or more of the controllers 40 communicatively coupled to the workstation(s) 30, 32 in the control room. The controllers 40 automate control of the field devices 44, 46 in the process area by executing process control strategies implemented via the workstations 30, 32. An example process strategy involves measuring a pressure using a pressure sensor field device and automatically sending a command to a valve positioner to open or close a flow valve based on the pressure measurement. The I/O cards 48 translate information received from the field devices 44, 46 to a format compatible with the controllers 40 and translate information from the controllers 40 to a format compatible with the field devices 44, 46.

Through the I/O cards 48, the controller 40 may communicate with the field devices 44, 46 according to the control modules 70 that have been downloaded to the controller 40. The control modules 70 are programmed using the configuration system 34. In the configuration system 34, an engineer may create the control modules 70 by, for instance, instantiating one or more function blocks. By way of example, the configuration engineer may instantiate an AI function block to receive an analog input from one of the field devices 44, 46, which AI function block may receive a variety of values (e.g., a signal value, alarm hi and low limits, a signal status, etc.) associated with the analog output of the field device 44, 46. The AI function block may output a corresponding signal to another function block (e.g., a proportional-integral-dirivative (PID) control function block, a custom function block, a display module, etc.) Once the AI function block is instantiated, associating the function block with a unique device tag associated with the field device 44, 46 will cause the function block, once downloaded to the controller 40, to cooperate with the appropriate I/O card 48 to process information from the correct field device 44, 46.

In the plant network of the site 10 illustrated in FIG. 2, the field devices 44, 46 connected to the controllers 40 may be standard 4-20 ma devices, may be smart field devices, such as HART®, Profibus, or FOUNDATION® Fieldbus field devices, which include a processor and a memory, or may be any other desired type of devices. Some of these devices, such as Fieldbus field devices (labeled with reference number 46 in FIG. 2), may store and execute modules, or sub modules, such as function blocks, associated with the control strategy implemented in the controllers 40 or which perform other actions within the process plant, such as data collection, trending, alarming, calibration, etc. Function blocks 72, which are illustrated in FIG. 2 as being disposed in two different ones of the Fieldbus field devices 46, may be executed in conjunction with the execution of the control modules 70 within the controllers 40 to implement process control, as is well known. Of course, the field devices 44, 46 may be any types of devices, such as sensors, valves, transmitters, positioners, etc., and the I/O devices 48 may be any types of I/O devices conforming to any desired communication or controller protocol such as HART, Fieldbus, Profibus, etc.

The process data database 58 may be connected to the data highway 54 and operates to collect and store process variable, process parameter, status and other data associated with the controllers, field devices, and any other devices within the plant at the site 10. During operation of the process plant, the process data database 58 may receive process data from the controllers 40 and, indirectly, the field devices 44-46 via the data highway 54.

The configuration database 60 stores the current configuration of the distributed control system 22 within the plant at the site 10 as downloaded to and stored within the controllers 40 and field devices 44, 46. The configuration database 60 stores process control functions defining the one or several control strategies of the distributed control system 22, configuration parameters of the devices 44, 46, the assignment of the devices 44, 46 to the process control functions, and other configuration data related to the process plant. The configuration database 60 may additionally store graphical objects or user displays as well as configuration data associated with these objects or displays as described in more detail herein to provide various graphical representations of elements within the process plant. Some of the stored graphical objects may correspond to process control functions (e.g., a process graphic developed for a certain PID loop), and other graphical objects may be device-specific (e.g., a graphic corresponding to a pressure sensor).

As shown in FIG. 1, the configuration database 60 may include a configuration file 74. The control modules 70 (and, in some embodiments, the display modules used at the workstations 30 and 32) may be part of the configuration file 74. That is, the control modules 70 may be stored in the configuration file 74 together with the display modules or separately from the display modules. In any event, the configuration file 74 generally stores the entire configuration of the DCS 22, including devices, device tags, friendly names, data formatting information (e.g., scaling information, unit types, etc.), information regarding which variables are associated with each control loop, defined control strategies, etc. As indicated previously, the configuration file 74 may also be downloaded to the controllers 40 to implement the control strategies defined in the configuration file 74.

The data historian 62 (another database) stores events, alarms, comments and courses of action taken by operators. The events, alarms, and comments may pertain to individual devices (e.g., valves, transmitters), communication links (e.g., wired Fieldbus segments, WirelessHART communication links), or process control functions (e.g., a PI control loop for maintaining a desired temperature set point).

The knowledge repository 64 stores references, operator logbook entries, help topics, or links to these and other documentation that operators and maintenance technicians may find useful when supervising the process plant at the site 10.

The user database 66 stores information about users such as the operator and the maintenance technician. In particular, the user database 66 may store a span-of-responsibility for each user. This may include information such as his or her organizational role, the user's span of control, an area within the process plant at the site 10 with which the user is associated, work team association, security information, system privileges, shift information, etc.

Each of the databases 58-66 may be any desired type of data storage or collection unit having any desired type of memory and any desired or known software, hardware or firmware for storing data. Of course, the databases 58-66 need not reside in separate physical devices. Thus, in some embodiments, some of the databases 58-66 may be implemented on a shared data processor and memory. In general, it is also possible to utilize more or fewer databases to store the data collectively stored and managed by the databases 58-66 in the example system of FIG. 2.

The AMS system 100 is a PC-based tool that includes software applications which perform device management tasks. One or more of the servers 105 and/or hosts 103 may be part of the AMS 100. The AMS 100 integrates device management (e.g., for the field devices 44 and 46) by helping users, for example, configure, calibrate, monitor, and troubleshoot any and all of the smart field devices or other equipment associated with the plant at the site 10 and to account for the status of the conventional devices within the DCS 22. This may include, for example, monitoring, troubleshooting, calibrating, and configuring any of the field devices 44 and 46 or other equipment in the process plant, including, e.g., the rotating equipment (not shown) and power generation and distribution equipment (not shown).

The AMS 100 may comprise any type of computer or microprocessor based system. A memory of the AMS 100 stores a set of AMS applications 129 and an AMS database 130. The AMS database 130 stores device-related information which is not available from smart field devices (for example, information pertaining to past configurations of the field devices; information pertaining to conventional field devices and other off-line devices, such as off-line smart devices); and information pertaining to service notes (including when the next service is needed, when calibration should be performed, who performed service procedures, any favored replacement devices, etc.).

The AMS database 130 may store data pertaining to off-line smart devices, and may store the data stored in a format identical to the format in which that data is actually stored within off-line smart devices so that, to the AMS 100, off-line devices appear to be available through the database 130 in essentially the same way that they would be available if those devices were on-line. Likewise, the database 130 may store data pertaining to conventional devices, and the data may be stored in a format identical to the format in which that data would be stored in a comparable smart device so that, to the AMS 100, conventional devices appear to be off-line smart devices. Moreover, the data in the AMS database 130 may be duplicative, in whole or in part, of data stored by the data historian 62.

The AMS 100 and the DCS 22 may each communicate with online field devices and with other online equipment. The forms of the various communications, also referred herein as messages, depend, in large part, on what communication standard the device employs (e.g., Fieldbus, HART, etc.) and on the device function. Moreover, the available data that may be gathered by the device, passed to and/or from the device to the AMS 100 or the DCS 22, and the available commands and functions that may be transmitted to and/or executed on the device, vary by the communication standard employed, the type of device, the device manufacturer, options installed on the device, function blocks configured and/or operating on the device, etc.

Personnel at a process control site such as the site 10 typically are not responsible for monitoring or controlling the entire process plant. Instead, personnel have different "spans-of-responsibility." With reference to an example refining process, for example, a specific operator may be responsible for one of the crude units and several diesel hydrotreaters. Other operators may be responsible for other sets of the same equipment (e.g., another crude unit in the same process area, a crude unit in another process area, etc.), some operators may be responsible for different sets of equipment (e.g., a naptha hydrotreater), and still other operators may be responsible for monitoring the process at a higher level (e.g., monitoring the overall refining process or characteristics of one or more of the output products).

Each operator may view, monitor, and/or manipulate a different display module (e.g., at one of the workstations 30 or 32) according to the operator's span-of-responsibility. Operators having similar spans-of-responsibility—for example, two operators that are each responsible for a crude unit—may look at identical looking display modules (that, respectively, show the data for the crude unit for which each operator is responsible), while other operators may look at different display modules adapted (i.e. designed or configured) to allow monitoring and/or manipulation of the parameters, devices, and processes corresponding to the span-of-responsibility of each. Still other personnel (e.g., not operators) may be responsible for environmental operations in the process plant, and may be interested in only the environmental parameters, alerts, and alarms associated with all of the equipment in the process plant, or subset of the equipment that may or may not correspond to the equipment within one of the operators' spans-of-responsibility.

The data and displays available in real time to operators and other personnel within the process plant, including real time process variables and parameters, alarms, warnings, alerts, configuration information (e.g., from the configuration file 74), control modules 70, display modules, batch information (for batch processes) and the like are collectively referred to throughout this specification as "process level data," and may include all of the data stored by, processed by, or communicated by the controllers 40. Process level data are valuable to operators, of course, but also to maintenance personnel and other business personnel who may need or desire to monitor the real-time conditions of all or part of the process. The performance indicators described herein may include process level data variables (e.g., TI-8732) storing process level data values (e.g., a measured temperature).

In the embodiments described herein, personnel may access the process level data and AMS data via the computing devices 14. This may be useful, for example, when an operator desires to monitor equipment within his span-of-responsibility during periods while she is not at work (e.g., during another shift), in order to keep watch on a particular issue that occurred previously, or just to maintain some amount of situational awareness for the purpose of continuity during shift changes (i.e., to have an idea of what has happened during previous shifts when coming back onto her shift). Meanwhile, maintenance personnel may wish to be alerted to problems that will need to be addressed upon their return to the process plant. Still further, personnel on the process plant premises (e.g., "on-shift" operators) may wish to collaborate with colleagues who are not presently on the premises, to receive help diagnosing and/or resolving an anomalous situation in the process plant, and having access to the process level data and AMS data while not physically present at the process plant may facilitate such collaboration. Of course, there are many other reasons why plant personnel would benefit from the availability of plant level data on the computing devices 14.

III. Example Displays Provided by Computing Devices

Figure 3A:
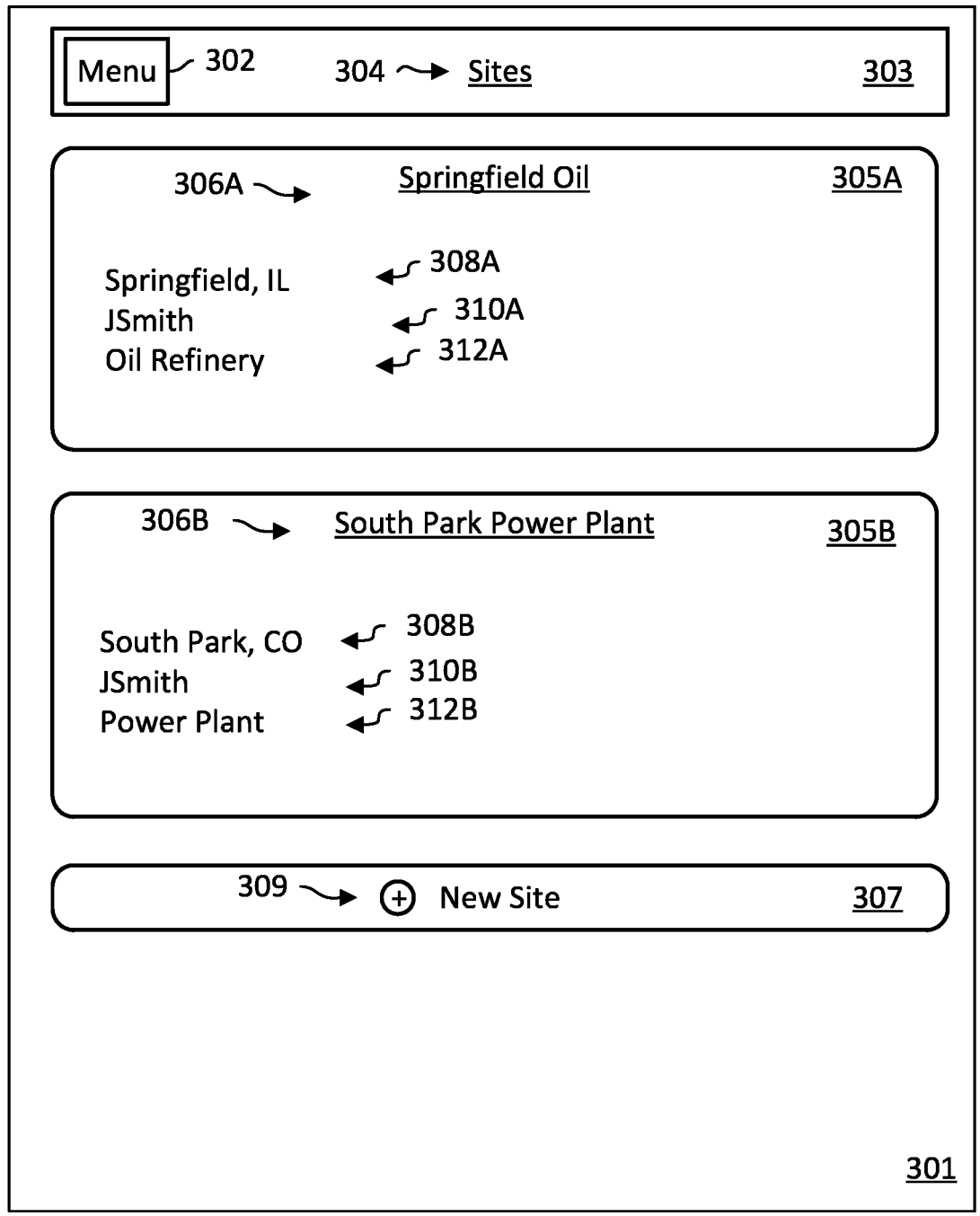
FIG. 3A depicts an example display that may be provided by a computing device, when implementing a performance monitoring client, to enable selection of a process control site by a user.
Figure 3B:
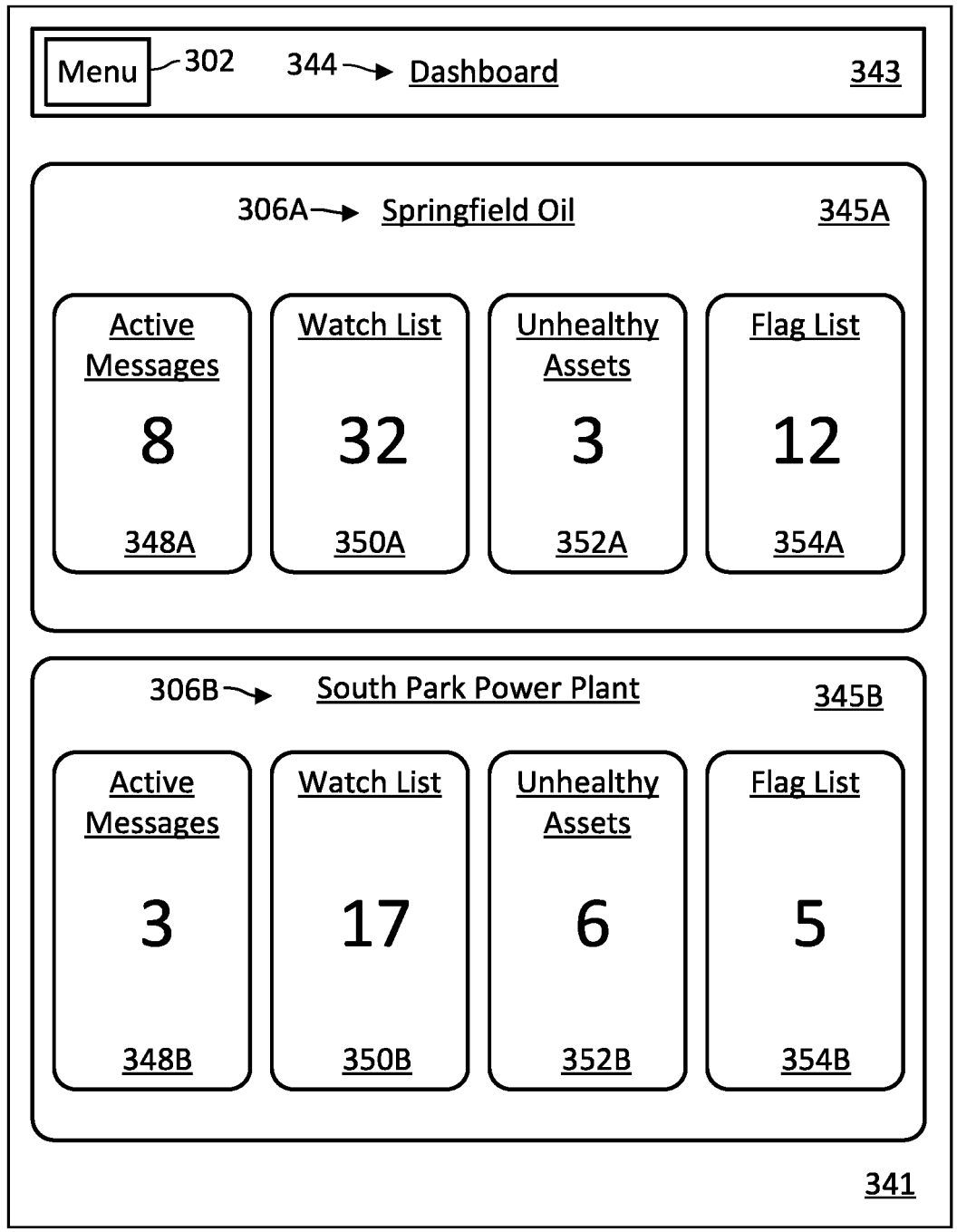
FIG. 3B depicts an example display including a dashboard overview that may be provided by a computing device when implementing a performance monitoring client.

FIGS. 3A-C illustrate example displays 301, 341, and 361 that the PM client 16 (shown in FIGS. 1 and 2) may cause the computing device 14 to provide when implemented. Each of the displays 301, 341, and 361 may be provided as part of a GUI provided by the PM client 16. The GUI provided by the PM client 16 may include multiple graphical elements (e.g., windows, icons, buttons, scroll bars, etc.), some of which may facilitate user-machine interaction (e.g., buttons that can be actuated to drive a next action, scroll bars that can be selected and manipulated to change a screen view, etc.). Generally speaking, the term "actuate" refers to the act of causing something (e.g., a GUI element or a hardware button) to operate or activate, which may trigger some other event or change of state (e.g., depressing a button may trigger the GUI to display a menu).

At a high level, the GUI shown in FIGS. 3A-C provides one or more elements (sometimes called site selection elements) for receiving a site selection from a user and responds to receiving a site selection by providing one or more elements (e.g., sometimes called dashboard elements) that display performance monitoring information pertaining to the selected sites (see FIGS. 3B and 3C). Generally speaking, one or more servers provide the performance monitoring information to the computing device implementing the GUI in response to the computing device transmitting a request to the one or more servers after receiving the site selection. In addition to displaying the received performance monitoring information, the GUI may sometimes display derivative performance monitoring information that has been generated by the computing device based on the received performance monitoring information (e.g., the computing device may count and display a number of alarms, count and display a number of performance indicators for a particular site, etc.).

FIG. 3A illustrates an example display 301 that may be provided by one of the computing devices 14, when implementing the PM client 16, to display currently selected sites (any one of which may be actuated to view PIs particular to the actuated site) and to enable selection of a new process control site. The display 301 includes a header 303, interactive site elements 305A and 305B, and an element 307 for adding a new site.

The header 303 includes a menu button 302 and a title 304 ("Sites") indicating that the display 301 is displaying one or more process control sites that can be selected by the user (e.g., via a touchscreen). A user may actuate the menu button 302 to cause the computing device 14 to display a menu including graphical elements, which may include information elements and/or interactive elements (e.g., to navigate through the GUI and to view other pages or interfaces). For example, the menu 302 may include the information displayed in the dashboard shown in display 341 in FIG. 3B (thus giving the user multiple ways to view the dashboard information). In some cases, the menu includes a "Settings" button, which may be actuated to view and change one or more settings associated with the system 101. For example, the user may sign in or sign out; change display settings such as color or zoom level; or change default settings regarding how the site elements 305A and 305B are displayed (e.g., default elements to display on startup; a default order for displaying the elements; etc.).

The interactive site elements 305A and 305B may be actuated by a user (e.g., via a touch gesture) to view PIs for the corresponding process control site. In particular, the user may actuate the element 305A to cause the computing device 14 to display information regarding the "Springfield Oil" site, and may actuate the element 305B to cause the computing device 14 to display information regarding the "South Park Power Plant." The displayed information may include performance indicators for the selected site. In some instances, the displayed information includes an overview, such as that shown in FIG. 3B, of various categories of performance indicators for the selected site.

The element 305A includes a name element 306A displaying a name of the site associated with the element 305A (e.g., "Springfield Oil"). The element 305A may also include information about the site. For example, the element 305A may display a location 308A, which may be a building and/or geographic location (e.g., town, state, and/or country). The element 305A may also list a username 310A of the user currently utilizing the computing device 14 to view the display 301. The username 310A may be a user ID uniquely associated with the user. Finally, the element 305A may include a site type 312, which may identify the type of the site (e.g., oil refinery, chemical refinery, research site, ethanol processing, etc.). The element 306B displays similar types of information with respect to a second site (here, the South Park Power Plant). The computing device 14 may display any suitable number of elements similar to elements 305A and 305B for additional sites, depending on a user's permissions, span-of-responsibility, and desire to view different sites.

The interactive graphical element 307 can be actuated to add a new site to the display 301. The element 307 includes a button and label 309 ("New Site"). The user may be required to enter information identifying a site (e.g., a site ID), and may be required to complete an authentication process (e.g., by entering a username and password, utilizing two-fact authentication, etc.) when attempting to add a new site. In some instances, selecting the element 307 may cause the computing device 14 to display a list of process control sites from which the user can choose. For any new site added via the element 307, the computing device 14 may display corresponding PIs (e.g., via the displays 341 and 361 shown in FIGS. 3B and 3C).

In some instances, the computing device 14 may provide more selectable sites than can be displayed simultaneously on the display 301. In such instances, the computing device 14 may enable the user to view additional site elements associated with process control sites by scrolling down (e.g., utilizing a swipe gesture on the screen of the computing device 14). In some instances, the display 301 may condense or abbreviate the elements 305A and 305B (and any other elements on the display 301) to fit additional elements on the display 301.

FIG. 3B illustrates an example display 341 including a dashboard overview display that may be provided by one of the computing devices 14 when implementing the PM client 16. The computing device 14 may provide the display 341 after the user has selected an interactive element (e.g., 305A or B) associated with a site. In some cases, a user may reach the display 341 by selecting a "Dashboard" button included in a menu displayed after an actuation of the menu button 302.

The display 341 includes a header element 343, a performance overview element 345A, and a performance overview element 345B. The elements 345A and 345B may be referred to as "dashboard elements" (as may any element displaying performance monitoring information pertaining to one or more selected process control sites).

The header 343 displays a title 344 (e.g., "Dashboard," "Dashboard Overview," or "Overview"), and may include the same menu button 302 shown in FIG. 3A.

The performance overview elements 345A and 345B each correspond to a particular process control site, and each displays a number of viewable performance indicators for each of a number of categories. Consequently, without directly viewing performance indicators, a user can quickly obtain a "snapshot" of a site's status. The overview elements included in the display 341 may have a one-to-one relationship with the site elements included in the display 301 (i.e., the performance overview elements in the display 341 may correspond to the same sites to which the site elements included in the display 301).

As shown, the performance overview element 343A includes the name 306A of the associated plant ("Springfield Oil") and sub-elements 348A, 350A, 352A, and 354A corresponding to categories of viewable performance indicators for the Springfield Oil plant. For the Springfield Oil site, the sub-element 348A indicates 8 active messages exist; 32 watchlist performance indicators exist; 3 unhealthy assets exist, and 12 flagged performance indicators exist. Any one of the sub-elements 348A-354A may be actuated to cause the computing device 14 to display the corresponding performance indicators.

The sub-element 342 displays a count of the active messages (eight in this case), which may include any message that is generated by a human or machine and directed to: (i) the user of the computing device 14, or (ii) to a group including the user (e.g., messages may be directed based on device, span-of-control, user location, or some combination thereof). The computing device 14 may display the active messages in response to a user actuating the sub-element 342.

The sub-element 350A displays a count for the watch list (32 in this case), which includes a set of performance indicators selected for the user of the computing device 14 and for the site of interest (Springfield Oil in this case). The sub-element 350A may be actuated to cause the computing device 14 to display the set of performance indicators. The watch list may be populated based on an analysis by the server(s) 105 (shown in FIGS. 1 and 2) of the relevant site profile (which may identify and potentially prioritize performance indicators of interest for the site) and of the user's profile (which may identify and potentially prioritize performance indicators of interest for the site). In some instances, the watch list is a sub-set of the set of performance indicators selected by the server 105. For example, the user or the user's manager may remove performance indicators he or she believes are unnecessary or less important to view. In some cases, the system 101 includes a whitelist of performance indicators to always show for a user monitoring a particular site and/or a blacklist of performance indicators to never show for a user, for a site, and/or for a user/site combination.

The sub-element 352A displays a count of unhealthy assets (three in this case) at the site and may be actuated to cause the computing device 14 to display a list of the unhealthy assets. Note, the unhealthy assets listed after actuating the sub-element 352A may be tags or names rather than performance indicators. For example, after actuation of the sub-element 352A, the computing device 14 may display three tags or names (such as TC-124, PU-295, and LT-873) having a health index below a threshold (e.g., 70%). This threshold may be stored by the server 105, and may be modified as desired by personnel so authorized. Different pieces of equipment and instrumentation may have different threshold values, and some may have no threshold values and/or no associated health index (i.e., certain equipment or instrumentation may not show as "unhealthy").

The sub-element 354A displays a count for the flag list (12 in this case), which includes a set of performance indicators that have been flagged (e.g., by the user or by a different user, such as a manager or colleague of the user). The sub-element 350A may be actuated to cause the computing device 14 to display the flagged performance indicators.

The sub-elements 348B-352B of the element 345B are similar in nature to the sub-elements 348A-352A. In some instances, the display 341 provides only a single element (e.g., only the element 345A) corresponding to a site selected via the display 301.

FIG. 3C illustrates an example display 361 including a watchlist display that may be provided by one of the computing devices 14 when implementing the PM client 16. The display 361 enables the user to view the names and values of performance indicators of interest. The performance indicators may be chosen by the user and/or by the one or more servers 105. Further, the user can manipulate the arrangement of the displayed performance indicators by changing the order in which they are displayed, removing performance indicators, or adding performance indicators. The displayed performance indicators may be segmented and displayed by process control site of interest, or may be displayed in a single list. In some instances, the number of viewable performance indicators exceeds the space provided by the display 361. In such instances, the user can scroll through the list to view additional performance indicators (e.g. utilizing a swiping touch gesture).

The display 361 includes a header element 363, a site watchlist element 365A, and a site watchlist element 365B. The elements 365A and 365B may be referred to as "dashboard elements" because each displays performance monitoring information pertaining to one or more selected process control sites.

The header 363 displays a title 364 (e.g., "Watchlist," "User Watchlist," etc.), and may include the same menu button 302 shown in FIGS. 3A and 3B.

The site watchlist element 365A corresponds to a process control site (Springfield Oil in this case) and includes performance indicators for that process control site. In particular, for each performance indicator included in the element 365A, the following may be displayed: (i) a name or tag 368A; (ii) a type 370A; (ii) a value 372A; and (iv) a flag status 374A. The site watchlist element 365B includes similar information 368B-374B.

The order of the performance indicators displayed in each element 365A, 365B may be determined by user-site scores assigned to the performance indicators. Each user-site score may represent the corresponding performance indicator's relevance or importance to both the user (e.g., JSmith) and the process control site (e.g., Springfield Oil). The user-site score may be a composite of a site score and a user score for the corresponding performance indicator.

The site score represents the corresponding performance indicator's importance to the process control site. The site score of a performance indicator may vary over time and may be calculated based on a number of factors, such as: (i) the importance of the performance indicator independent of its value; (ii) the value of the performance indicator; (iii) the state of the process control system at the site (e.g., based on modes of operation, such as normal operation mode, model generation mode, etc.); (iv) the type of continuous or batch process(es) currently being controlled; (v) time on-line; (vi) historical process models; or (vi) some combination thereof. A performance indicator may be more or less important to a given site based on changes to any one of these factors, and the site score may rise or drop in accordance with the changes.

To illustrate, performance indicators may be scored independent of their values because some may correspond to process variables that need to be more tightly controlled, or may correspond to process variables for which changes in value have significant impact. For example, at a nuclear power plant, core temperature variables may be very highly scored independent of the currently measured temperate (e.g., because maintaining safe core temperatures is critical for safe operation), while atmospheric humidity may have a relatively lower score independent of the currently measured humidity (e.g., because extreme humidity generally matters far less to maintaining safe operation).

The user score represents a level of the user's interest in the corresponding performance indicator, and may be calculated based on an analysis of one or more of the following factors: (i) a history of the user's interaction with the performance indicator; (ii) a weight provided by the user; (iii) the user's span-of-responsibility; (iv) one or more tasks assigned to the user; (v) a set of user-selected performance indicators; (vi) the value of the performance indicator; or (vii) some combination thereof. Because one or more of these factors may change over time, the user score may also change over time.

Each of the user score, site score, and user-site score may be represented with any desired level of granularity. For example, one or more of the scores may be binary in nature (e.g., the tailoring may involve identifying whether a performance indicator should be included in the set of tailored performance indicators based on whether its user-site score is 1 or 0), or may be scored on a more granular scale (e.g., 1-10 or 1-100).

IV. Block Diagrams of an Example Computing device and an Example Host Device

Figure 4:
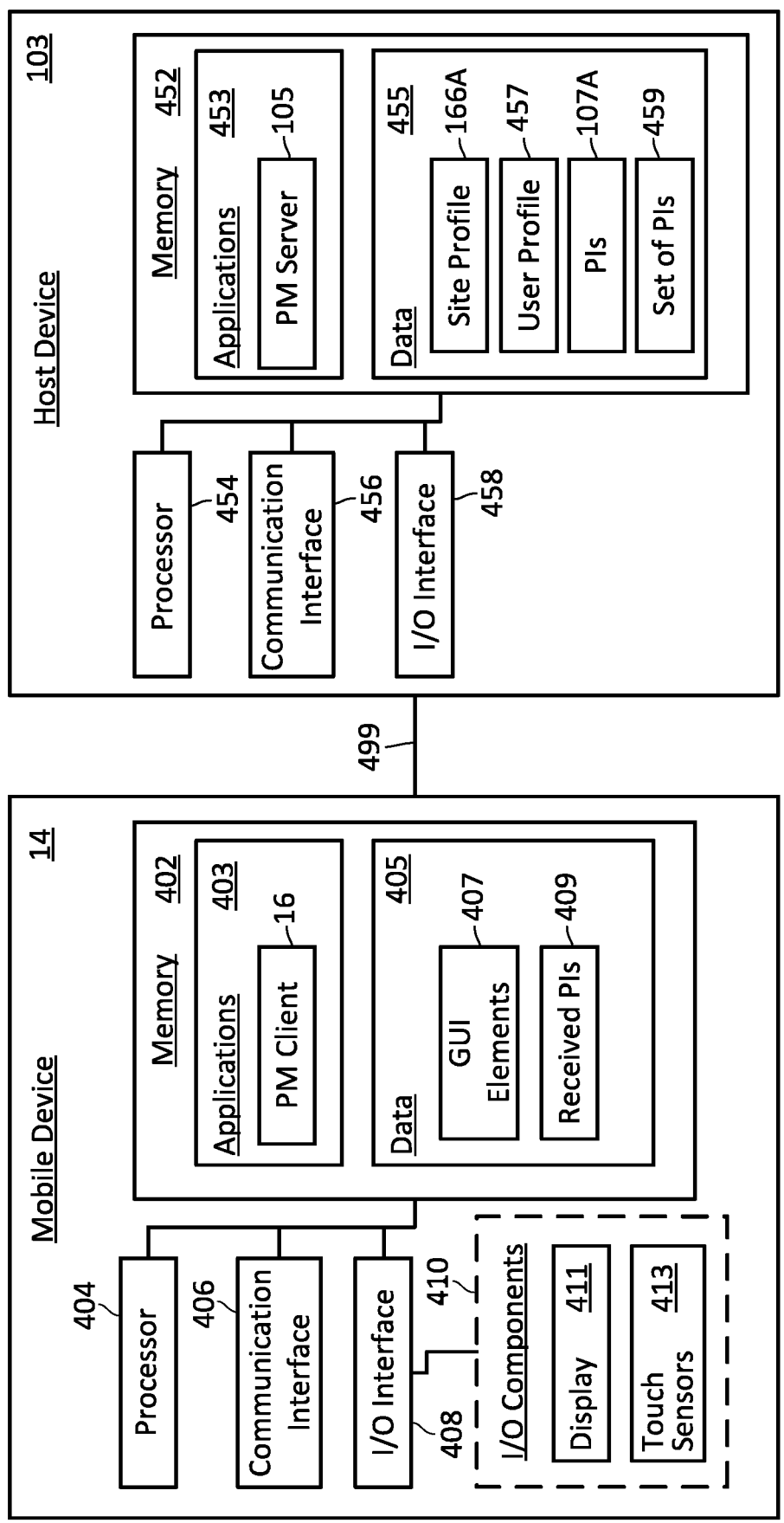
FIG. 4 is a block diagram of an example computing device and of an example host device, examples of which are also shown in FIGS. 1 and 2.

FIG. 4 is a block diagram of an example computing device 14 and an example host device 103, examples of which are also shown in FIGS. 1 and 2. The computing device 14 is communicatively coupled to the host device 103 by way of the one or more links 499, which may include wireless or wired links, as well as one or more intermediary devices. Below, components of the computing device 14 and the host device 103 are briefly described.

As previously noted, the computing device 14 may be any suitable electronic computing device. The computing device 14 includes a memory 402, a processor 404, a communication interface 406, and an input/output (I/O) interface 408, each of which may be communicatively coupled to a system bus of the computing device 14. One or more I/O components 410 may be communicatively connected to the I/O interface 408. One or both of the I/O interface 408 and the I/O components 408 may sometimes be referenced as a "user interface," a "man-machine interface (MMI)," or a "human-machine interface (HMI)."

The I/O components 410 may include one or more input components or one or more output components. Input components may include sensors that generate a signal (e.g., transmitted to the I/O interface 408 and/or processor 402) in response to a detected change corresponding to a user input, such as a change in a mechanical actuator (e.g., a button) or a change in a detected electromagnetic property (e.g., a capacitive touch sensor). In the shown example, the I/O components 410 include a screen display 411 and touch sensors 413 (e.g., capacitive or resistive), which may be integrated as a touchscreen. The display 411 may be any suitable resolution and size (e.g., anywhere in the range of four inches to thirteen inches, or more if desired). The I/O components 410 may include additional or alternative components, such as mechanical actuators (e.g., buttons, toggles, etc.), stylus sensors, lights (e.g., LED), a camera, a microphone, etc.

The memory 402 includes one or more applications 403 (including an instance of the PM client 16—also shown in FIG. 1) and data 405 (including GUI elements 407 and a set of received PIs 409). As explained below in more detail, the PIs 409 are received by the computing device 14 from the host device 403.

The host device 103 includes a memory 452, a processor 454, a communication interface 456, and an I/O interface 458, each of which may be communicatively coupled to a system bus of the host device 103. The memory 452 includes (i) applications 453, including the PM server 105 (also shown in FIGS. 1 and 2); and (ii) data 455 that includes the site profile 166A (also shown in FIG. 1), a user profile 457 (which may be one of the plurality of user profiles 168A shown in FIG. 1), the PIs 107A (also shown in FIG. 1), and a set of PIs 459 selected from the PIs 107A.

Generally speaking, the PIs 107A may include all PIs associated with a process control site. Each of the site profile 166A and the user profile 457 may include a subset of PIs selected from the PIs 107A (though it is possible that either could include every PI in the PIs 107A).

The set of PIs 459 is tailored to both the user associated with the user profile 457 and to the process control site associated with the site profile 166A. The PM server 105 selects the set of PIs 459 based on an analysis of the site profile 166A and the user profile 457. This analysis may involve evaluating user-site scores for each PI included in the profiles 166A and 457, and selecting based on that evaluation. For example, the PM servers 105 may pick for inclusion in the PIs 459 the top X % of PIs, the top X highest scoring PIs, or the PIs having a user-site score above a minimum threshold.

V. Example Methods to Facilitate Monitoring Performance

Figure 5:
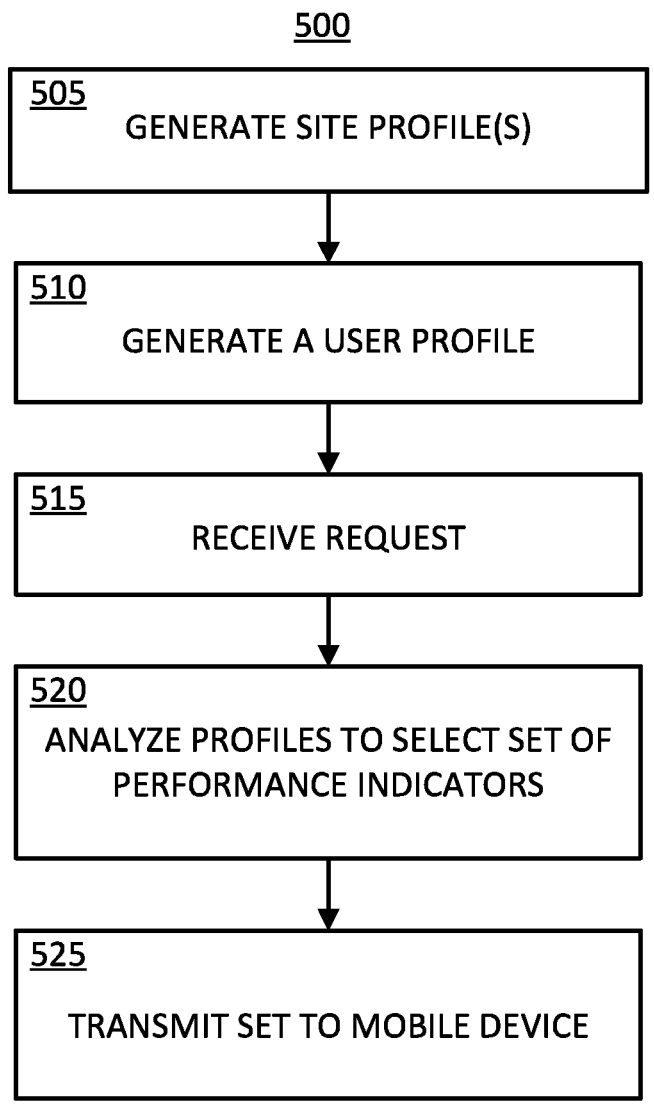
FIG. 5 is a flow chart of an example method of monitoring performance of a process control site.

FIG. 5 is a flow chart of an example method 500 of monitoring performance of a process control site. The method 500 may be implemented, in whole or in part, by the system 101 and, in particular, by the host device(s) 103, server(s) 105, computing device(s) 14, and/or PM client(s) 16.

At step 505, the site profile 166A is generated. The site profile 166A includes or references a subset of the PIs 107A, which the host device 103 may identify by "high priority" from the PIs 107A (for e.g., based on site scores for each of the PIs 107A). Further, the high priority PIs identified by the site profile 166A may be prioritized or divided into categories (e.g., based on plant area, PI type, etc.). For each site that can be monitored via the system 101, a site profile may be generated, and each site profile may include or reference PIs unique to that site.

At step 510, the user profile 457 is generated. The user profile 457 may include or reference a subset of PIs 107A that are relevant to the user associated with the user profile 457, and may be generated based on an analysis of the (i) users span-of-responsibility, (ii) the user's current location, (iii) a manual selection of PIs by the user, (iv) a manual selection of PIs by a colleague or manager of the user, (v) the user's viewing history pertaining to different PIs (e.g., indicating which of the PIs at the site the user frequently views and those the user infrequently views), or (vi) or some combination thereof.

At step 515, the host device 103 receives via the communication interface 456 a message including a request for performance monitoring information from the computing device 14. The message may include one or more site IDs corresponding to selected process control sites and a user ID corresponding to the user of the computing device 14. The computing device 14 may wirelessly transmit the message in response to the computing device 14 detecting user input (e.g., via a GUI) representing a selection of one or more process control sites. The GUI may provide a number of different process control sites for the user to choose from to be added to his or her selection, or the user may directly identify the selection(s) (e.g., by entering unique site IDs for the sites).

At step 520, the host device 103 analyzes the site profile 166A (and any other site profile for other sites selected by the user) and the user profile 457 to generate the set of tailored PIs 459. The profiles to be analyzed may be selected by the host 103 by identifying a user ID and one or more site IDs included in the message received at step 515. The host 103 can use this user ID and site ID(s) to identify the appropriate profiles.

The analysis may involve cross referencing the user profile 457 and the site profile 166A. Each PI in each profile may be scored with a user-site score to determine which PIs are selected. Example scores and scoring techniques are described in more detail below with respect to FIG. 6.

At step 525, the host 103 may transmit the tailored PIs 459 to the computing device 14, where they may be stored to the memory 402 (e.g., a cache memory, volatile memory such as RAM, or data storage memory such as disk storage) as the received PIs 409. The computing device 14 displays the tailored PIs 409 via the display 411 (e.g., utilizing a GUI providing a display such as that shown in FIG. 3C). The computing device 14 may segment the displayed PIs 409 by process control site (as shown in FIG. 3C), or may display the PIs 409 in a non-segmented fashion if desired.

The user of the computing device 14 may manipulate the order of the displayed PIs 409 utilizing interactive elements of the provided GUI. For example, each displayed PI 409 may be located within a region of the screen functioning as an interactive element. The user may touch the screen at this region and "drag" the PI up or down to rearrange the order of display PIs 409. Alternatively, the user may touch the screen at this region, which may cause the computing device 14 to display a prompt with a button for "raising" or "dropping" the corresponding PI within the displayed order. To add a PI, the user may touch an interactive element corresponding to a region containing empty space, and may respond to a generated prompt asking if the user would like to add a new PI. The GUI may also prompt the user to add the PI to a whitelist. If the user whitelists a PI, the PI may always be displayed when the user is viewing PIs for the corresponding site. To remove a PI, the user may "swipe" to the left or right, or may touch the region and respond to a generated prompt asking the user if he or she would like to remove the PI. The GUI may also prompt the user to add the PI to a blocklist. If the user blacklists a PI, the PI will not be displayed again in the future unless the user explicitly adds the PI to his or her display. In some instances, the computing device 14 may identify and display counts of different types included in the PIs 409 (e.g., see the categories and counts displayed in FIG. 3B).

Figure 6:
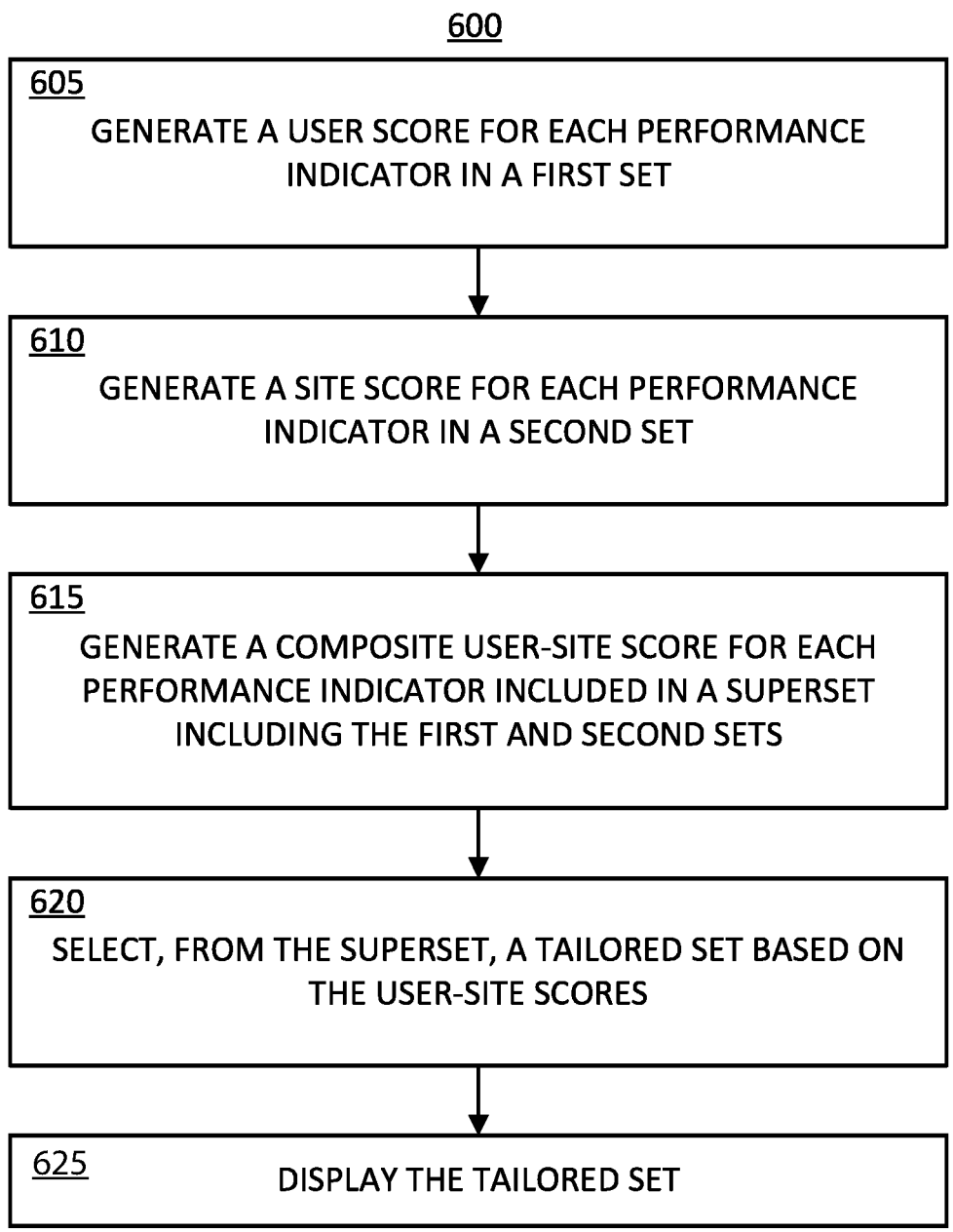
FIG. 6 is a flow chart of an example method of utilizing scores to develop a tailored set of performance indicators.

FIG. 6 is a flow chart of an example method 600 of utilizing scores to develop a tailored set of performance indicators. The method 600 may be implemented, in whole or in part, by the system 101 and, in particular, by the host device(s) 103, server(s) 105, computing device(s) 14, and PM client(s) 16.

At step 605, the host 103 generates a user score for each of a first plurality of PIs associated with the user profile (e.g., profile 457 shown in FIG. 4) for a user. A user score for a particular PI generally represents a level of the user's interest in the particular PI. The user score may be generated before or after the host 103 receives a request for performance monitoring information. The user score for each PI may be calculated based on an analysis of one or more of the following factors: (i) a history of the user's interaction with the performance indicator; (ii) a weight provided by the user; (iii) the user's span-of-responsibility; (iv) one or more tasks assigned to the user; (v) a set of user-selected performance indicators; and (vi) the value of the performance indicator.

At step 610, the host 103 generates a site score for each of a second plurality of PIs associated with one or more site profiles (e.g., the one or more site profiles 166A-166C shown in FIG. 1) for one or more process control sites. The site score of each PI may be calculated based on an analysis of: (i) the importance of the PI independent of its value; (ii) the value of the PI; or (iii) the state of the process control system. The importance of the PI independent of its value may be represented by an index generated based on an analysis of historical process control data or historical AMS data relevant to the PI.

The second plurality is not necessarily mutually exclusive with the first plurality of PIs, and it is possible the two are identical sets. For example, if a system includes only a single process control site, it is possible a user profile references the same PIs referenced by the site profile. The site score may be generated before or after the host 103 receives a request for performance monitoring information.

At step 615, the host 103 generates a user-site score for each PI included in a superset including the first and second plurality of PIs. The user-site score represents a composite score accounting for both the user score and the site score for the corresponding performance indicator. In some instances, the user-site score does not represent a composite. For example, in some embodiments the system may not include independent user scores and site scores for PIs, and the user-site score may be calculated based on an analysis accounting for one or more of the factors described with respect to steps 605 and 610.

At step 620, the host 103 selects, from the superset, a set of performance indicators tailored to the user and to the one or more process control sites based on the user-site scores. The host 103 may select a number, at or below a maximum threshold, of performance indicators having the highest user-site scores. Additionality or alternatively, the host 103 may select PIs having user-site scores above a user-site score threshold. The maximum threshold or user-site score threshold may be set by a user of the computing device 14, by the client 16 (e.g., based on an analysis of screen size or hardware components of the computing device 14), by a user at the process control site 10, or by the server 105.

At step 625, the tailored set of performance indicators is displayed by the computing device 14 (e.g., via a GUI implemented by the client 16, which may be a browser a dedicated application). The user may manipulate user-site scores associated each PI. For example, the user may touch the region including the PI, and the GUI may provide a prompt for manipulating the PI's score. After the user has manipulated the score, the GUI may update the order to reflect the new order of the PIs.

The above steps may occur in an order other than that displayed. For example, step 610 may occur before step 605.

VI. Additional Considerations

Although this detailed description contemplates various embodiments, it should be understood that the legal scope of any claimed system or method is defined by the words of the claims set forth at the end of this patent. This detailed description is to be construed as exemplary only and does not describe every possible embodiment, as describing every possible embodiment would be impractical, if not impossible.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This description, and the claims that follow, should be read to include one or at least one. The singular also includes the plural unless it is obvious that it is meant otherwise.

In various embodiments, hardware systems described herein may be implemented mechanically or electronically. For example, a hardware system may comprise dedicated circuitry or logic that is permanently configured (e.g., as a special-purpose processor, such as a field programmable gate array (FPGA) or an application-specific integrated circuit (ASIC) to perform certain operations). A hardware system may also comprise programmable logic or circuitry (e.g., as encompassed within a general-purpose processor or other programmable processor) that is temporarily configured by software to perform certain operations. It will be appreciated that the decision to implement a hardware system mechanically, in dedicated and permanently configured circuitry, or in temporarily configured circuitry (e.g., configured by software) may be driven by cost and time considerations.

Throughout this specification, some of the following terms are used.

Bus. Generally speaking, a processor or a particular system or subsystem may communicate with other components of the system or subsystem via one or more communication links. When communicating with components in a shared housing, for example, the processor may be communicatively connected to components by a system bus. Unless stated otherwise, as used herein the phrase "system bus" and the term "bus" refer to: a data bus (for carrying data), an address bus (for determining where the data should be sent), a control bus (for determining the operation to execute), or some combination thereof. Depending on the context, "system bus" or "bus" may refer to any of several types of bus structures including a memory bus or memory controller, a peripheral bus, or a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Communication Interface. Some of the described devices and/or systems include a "communication interface" (sometimes referred to as a "network interface"). For example, the computing device 14 and the workstation 22 shown in FIG. 4 include the communication interface 406 and the communication interface 456, respectively. Each of these communication interfaces enables the system of which it is a part to send information or data to other systems and/or receive information/data from other systems. In some instances, the communication interfaces may be utilized to establish a direct connection to another system. In some instances, the communication interfaces enable the system (e.g., the computing device 14 or the host device 13) to connect to a network (e.g., the network 140).

The described communication interfaces can include circuitry for permitting wireless communication (e.g., short-range and/or long-range communication) or wired communication with one or more devices or systems using any suitable communications protocol. For example, a communication interface may support Wi-Fi (e.g., an 802.11 protocol), Ethernet, Bluetooth, high frequency systems (e.g., 900 MHZ, 2.4 GHZ, and 5.6 GHZ communication systems), infrared, transmission control protocol/internet protocol ("TCP/ 1P") (e.g., any of the protocols used in each of the TCP/IP layers), hypertext transfer protocol ("HTTP"), Bit-Torrent, file transfer protocol ("FTP"), real-time transport protocol ("RTP"), real-time streaming protocol ("RTSP"), secure shell protocol ("SSH"), any other communications protocol, or any combination thereof. The communication interfaces may include circuitry enabling electrical or optical coupling to another device (e.g., via a coax cable or fiber optic cable) and to communicate with that other device.

Communication Link. A "communication link" or "link" is a pathway or medium connecting two or more nodes. A link may be a physical link and/or a logical link. A physical link is the interface and/or medium(s) over which information is transferred, and may be wired or wireless in nature. Examples of physicals links may include a cable with a conductor for transmission of electrical energy, a fiber optic connection for transmission of light, and/or a wireless electromagnetic signal that carries information via changes made to one or more properties of an electromagnetic wave(s). A logical link between two or more nodes represents an abstraction of the underlying physical links and/or intermediary nodes connecting the two or more nodes. For example, two or more nodes may be logically coupled via a logical link. The logical link may be established via any combination of physical links and intermediary nodes (e.g., routers, switches, or other networking equipment).

Memory and Computer-Readable Media. Some of the described devices and/or systems include a "memory" or "memory device." For example, the computing device 14 and the host device 103 shown in FIG. 4 include the memory 402 and 452, respectively. Referencing FIG. 2, one or more of the controllers 40, the field devices 44 and 46, the workstations 30 and 32, and the AMS 100 may include a memory. Further, the databases 58-66 are stored at a memory.

Each of the above memories is a device including computer-readable media ("CRM"). "CRM" refers to a medium or media accessible by the relevant computing system for placing, keeping, and/or retrieving information (e.g., data, computer-readable instructions, program modules, applications, routines, etc). Note, "CRM" refers to media that is non-transitory in nature, and does not refer to disembodied transitory signals, such as radio waves.

The CRM may be implemented in any technology, device, or group of devices included in the relevant computing system or in communication with the relevant computing system. The CRM may include volatile and/or nonvolatile media, and removable and/or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store information and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is circuitry that manages the flow of data between the CRM and the system bus.

Network. As used herein and unless otherwise specified, when used in the context of system(s) or device(s) that communicate information or data, the term "network" refers to a collection of nodes (e.g., devices or systems capable of sending, receiving and/or forwarding information) and links which are connected to enable telecommunication between the nodes.

A network may include dedicated routers responsible for directing traffic between nodes, and, optionally, dedicated devices responsible for configuring and managing the network. Some or all of the nodes may be also adapted to function as routers in order to direct traffic sent between other network devices. Network devices may be interconnected in a wired or wireless manner, and network devices may have different routing and transfer capabilities. For example, dedicated routers may be capable of high volume transmissions while some nodes may be capable of sending and receiving relatively little traffic over the same period of time. Additionally, the connections between nodes on a network may have different throughput capabilities and different attenuation characteristics. A fiberoptic cable, for example, may be capable of providing a bandwidth several orders of magnitude higher than a wireless link because of the difference in the inherent physical limitations of the medium. A network may include networks or sub-networks, such as a local area network (LAN) or a wide area network (WAN).

Node. Generally speaking, the term "node" refers to a connection point, redistribution point, or a communication endpoint. A node may be any device or system (e.g., a computer system) capable of sending, receiving and/or forwarding information. For example, end-devices or end-systems that originate and/or ultimately receive a message are nodes. Intermediary devices that receive and forward the message (e.g., between two end-devices) are also generally considered to be "nodes."

Processor. Some of the described devices and/or systems include one or more "processors." For example, the computing device 14 and the host device 103 shown in FIG. 4 include one or more processors 404 and one or more processors 454, respectively. Referencing FIG. 2, one or more of the following may include one or more processors: the controllers 40, the field devices 44 and 46, the workstations 30 and 32, and the AMS 100.

The various operations of example methods described herein may be implemented, at least partially, by one or more of the above listed processors. Generally speaking, the terms "processor" and "microprocessor" are used interchangeably, each referring to a computer processor configured to fetch and execute instructions stored to memory. By executing these instructions, the processor(s) can carry out various operations or functions defined by the instructions. The processor(s) may be temporarily configured (e.g., by instructions or software) or permanently configured to perform the relevant operations or functions (e.g., a processor for an Application Specific Integrated Circuit, or ASIC), depending on the particular embodiment. For example, in some embodiments one or more of the field devices 44, 46 or one or more of the controllers 40 includes an ASIC with a processor.

Each processor may be part of a chipset, which may also include, for example, a memory controller and/or an I/O controller. A chipset is a collection of electronic components in an integrated circuit that is typically configured to provide I/O and memory management functions as well as a plurality of general purpose and/or special purpose registers, timers, etc. Generally speaking, one or more of the described processors may be communicatively coupled to other components (such as the described memory devices, communication interfaces, and I/O interfaces) via a system bus.

The performance of certain of the operations may be distributed among the one or more processors, not only residing within a single machine, but deployed across a number of machines.

Words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

What is claimed is:

1. A system for monitoring performance of process control systems, the system comprising:
    (A) a computing device including: (i) a user interface, and (ii) a processor that, in response to the computing device receiving via the user interface an input representing a request to view performance monitoring information pertaining to a set of process control sites, causes the computing device to transmit a message including a request for performance indicators;
    (B) one or more memory devices storing: (i) a plurality of site profiles for a plurality of process control sites, wherein each site profile includes a record of performance indicators selected for a one of the plurality of process control sites; and (ii) a plurality of user profiles for a plurality of users, wherein each user profile includes a record of performance indicators selected for a one of the plurality of users; and
    (C) one or more servers that, in response to receiving the message from the computing device, transmit to the computing device a set of performance indicators tailored to the set of process control sites and to a user of the computing device based on an analysis of: (i) a set of site profiles, from the plurality of site profiles, uniquely associated with a plurality of site IDs included in the received message; and (ii) a user profile, from the plurality of user profiles, uniquely associated with a user ID included in the received message;
    wherein the computing device further includes a display that the computing device uses to display the set of performance indicators in response to the computing device receiving the set of performance indicators.

2. The system of claim 1, wherein:
the computing device is a mobile device;
the display is a touchscreen;
the user interface includes one or more touch sensors configured to detect touch input at the touchscreen; and
the input representing the request to view performance monitoring information is a touch input.

3. The system of claim 1, wherein the computing device displays the set of performance indicators in an order selected by the user.

4. The system of claim 1, wherein each performance indicator in the set of performance indicators is assigned a user-site score representing the performance indicator's relevance to both the user and to a process control site to which the performance indicator corresponds.

5. The system of claim 4, wherein the computing device displays the set of performance indicators in an order determined by the user-site scores for performance indicators in the set of performance indicators.

6. The system of claim 1, wherein the one or more memory devices include site scores for performance indicators included in the plurality of site profiles, each site score representing a relative importance of a performance indicator to a one of the process control sites to which the set of site profiles corresponds;
wherein each site score is calculated based on an analysis of one or more of the following factors: (i) the importance of the associated performance indicator independent of its value, (ii) the value of the associated performance indicator; or (iii) the state of the process control system.

7. The system of claim 6, wherein the importance of the associated performance indicator independent of its value is represented by an index generated based on an analysis of historical process control data or historical AMS data.

8. The system of claim 1, wherein the one or more memory devices include user scores for performance indicators included in the plurality of user profiles, each user score representing a relative importance of a performance indicator to the user corresponding to the user profile;
wherein each user score is calculated based on an analysis of one or more of the following factors: (i) a history of the user's interaction with the performance indicator, (ii) a weight provided by the user; (iii) the user's span-of-responsibility; (iv) one or more tasks assigned to the user; (v) a set of user-selected performance indicators; and (ii) the value of the performance indicator.

9. The system of claim 1, wherein the analysis includes identifying performance indicators included in at least one of the user profile and the set of site profiles, and
wherein the set of performance indicators is tailored by selecting all of the identified performance indicators for inclusion in the set of performance indicators.

10. The system of claim 1, wherein the analysis includes calculating a user-site score for each performance indicator included in either the set of site profiles or the user profile, wherein each user-site score represents a performance indicator's relevance to the user and to a process control site to which the performance indicator corresponds.

11. The system of claim 10, wherein the set of performance indicators are tailored by: selecting a number of performance indicators having the highest user-site scores, wherein the value of the number equal to or less than a predefined a maximum threshold.

12. The system of claim 10, wherein the set of performance indicators are tailored by: selecting the performance indicators having user-site scores above a user-site score threshold.

13. The system of claim 1, wherein the computing device displays the set of performance indicators by way of a browser application.

14. A method of monitoring performance of process control systems, the method comprising:
(A) detecting, at a user interface of a computing device, a request to view performance monitoring information pertaining to a set of process control sites;
(B) responding to the request by transmitting, by the computing device, a message including a request for performance indicators;
(C) receiving, at one or more servers, the message;
(D) analyzing a set of site profiles and a user profile to select a set of performance indicators tailored to the set of process control sites and to a user of the computing device, wherein:
(i) the set of site profiles is selected from a plurality of site profiles based on a set of site IDs included in the received message, wherein each site ID in the set of site IDs is uniquely associated with a different site profile in the set of site profiles; and
(ii) the user profile is selected from a plurality of user profiles based on a user ID included in the received message, wherein the user ID is uniquely associated with the user profile;
(E) transmitting, to the computing device, the selected set of performance indicators; and
(F) displaying, at a display of the computing device, the selected set of performance indicators.

15. The method of claim 14, wherein analyzing the set of site profiles and the user profile to select the set of performance indicators comprises:
generating a user score for each of a first plurality of performance indicators associated with the user profile, wherein each user score represents a level of the user's interest in a performance indicator associated with the user score;
generating a site score for each of a second plurality of performance indicators associated with the set of site profiles, wherein each site score represents a level of significance a performance indicator possesses for a process control site to which the performance indicator corresponds;
generating a user-site score for each performance indicator included in a superset including the first and second plurality of performance indicators, each user-site score representing a composite score accounting for both the user score and the site score associated with the performance indicator; and
selecting, from the superset, the set of performance indicators based on the user-site scores for the performance indicators in the superset.

16. The method of claim 15, wherein displaying the set of performance indicators comprises:
displaying the selected set of performance indicators according the user-site scores associated with the performance indicators.

17. The method of claim 14, wherein displaying the set of performance indicators comprises:
displaying multiple sub-sets of the set of performance indicators, wherein each sub-set corresponds to a different process control site.

18. The method of claim 14, wherein analyzing the set of site profiles and the user profile comprises: selecting, for inclusion in the set of performance indicators, performance indicators included in both the user profile and the set of site profiles.

19. A computing device for monitoring performance of process control systems, the computing device comprising:
a processor;
a user interface sensor communicatively coupled to the processor;
a display communicatively coupled to the processor;
a communication interface coupled to the processor;
a memory communicatively coupled to the processor and storing non-transitory computer readable instructions that, when executed by the processor, cause the computing device to:
(A) display, via the display, a plurality of selectable process control sites;
(B) detect, via the user interface sensor, an input representing a selected one or more process control sites from the plurality of selectable process control sites;
(C) transmit to one or more servers a message including: (i) a request for performance indicators, (ii) one or more site IDs uniquely associated with the selected one or more process control sites, and (iii) a user ID unique to a user of the computing device;
(D) receive, from the one or more servers, a set of performance indicators tailored to the selected process control site and to the user of the computing device based on an analysis of: (i) a user profile unique to the user ID, and (ii) one or more site profiles unique to the one or more site IDs; and
(E) display, at the display, the set of performance indicators tailored to the selected process control site and to the user of the client device.

20. The computing device of claim 19, wherein:
each performance indicator in the set of performance indicators is assigned a user-site score representing the performance indicator's relevance to both the user and to a process control site, associated with one of the one or more site profiles, to which the performance indicator corresponds; and
the computing device displays the set of performance indicators according to an order of the selected set of performance indicators by way of the user-site scores.

21. The computing device of claim 20, wherein the memory further includes non-transitory computer readable instructions that, when executed by the processor, cause the computing device to:
display, at the display, an interactive element for increasing or decreasing a particular user-site score assigned to a particular performance indicator;
adjust the particular user-site score in response to detecting a user input corresponding to the interactive element; and
dynamically reorder the displayed set of performance indicators when adjusting the particular user-site score changes the order of the selected set of performance indicators by user-site score.

22. The computing device of claim of claim 19, wherein the memory further includes non-transitory computer readable instructions that, when executed by the processor, cause the computing device to:
display, at the display, an interactive element for removing a particular performance indicator; and
stop displaying the particular performance indicator in response to detecting, via the user interface sensor, a user input corresponding to the interactive element.

23. The computing device of claim 19, wherein the memory further includes non-transitory computer readable instructions that, when executed by the processor, cause the computing device to:
display an interactive element for viewing unhealthy assets; and
display one or more unhealthy assets in response to detecting a user input corresponding to the interactive element, wherein each of the one or more unhealthy assets are identified based a value of a performance indicator associated with the unhealthy asset.

24. The computing device of claim 19, wherein the memory further includes non-transitory computer readable instructions that, when executed by the processor, cause the computing device to:
display a dashboard element including one or more category elements, wherein each of the one or more category elements displays a count of performance indicators falling within a category.

25. The computing device of claim 24, wherein the memory further includes non-transitory computer readable instructions that, when executed by the processor, cause the computing device to:
detect an actuation of a one of the one or more category elements; and
in response to the actuation, display one or more performance indicators falling within the category corresponding to the actuated category element.

* * * * *